Feb. 27, 1945.   J. L. BUCKMASTER   2,370,143
CAMERA LUCIDA INSTRUMENT AND PRISMATIC UNIT THEREFOR
Filed Jan. 6, 1944   4 Sheets-Sheet 1

INVENTOR
JAMES L. BUCKMASTER
BY
ATTORNEY

Feb. 27, 1945. J. L. BUCKMASTER 2,370,143
CAMERA LUCIDA INSTRUMENT AND PRISMATIC UNIT THEREFOR
Filed Jan. 6, 1944 4 Sheets-Sheet 2

INVENTOR
JAMES L. BUCKMASTER
BY
ATTORNEY

INVENTOR
JAMES L. BUCKMASTER
BY
ATTORNEY

INVENTOR
JAMES L. BUCKMASTER
BY
ATTORNEY reserved

UNITED STATES PATENT OFFICE 2,370,143

CAMERA LUCIDA INSTRUMENT AND PRISMATIC UNIT THEREFOR

James L. Buckmaster, Arlington, Va.

Application January 6, 1944, Serial No. 517,200

9 Claims. (Cl. 88—24)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to improvements in camera lucida instruments and prismatic units for use in transferring detail from one medium to a second medium as by tracing a virtual image of a photograph on a map base.

The invention has particular application in the field of photogrammetry and for purposes of illustration will, therefore, be disclosed as it would be used in such field. Other fields, in which the principles and features of this invention may be used to advantage, will be obvious from an understanding of this disclosure and are within the scope of this invention.

Aeronautical charts and maps are produced by the compilation of cartographic data from aerial photographs. According to one photographic method for obtaining map detail, three wide angle single lens cameras are mounted in an airplane to produce a vertical photograph and two oblique photographs by simultaneous exposures. The angular relationship between the two cameras taking the oblique photographs (and also the angular relationship of their optical axes) is usually approximately 120° although the angle may be of different degree. The oblique angle is approximately bisected by the third camera (the vertical camera taking a vertical photograph) and also its optical axis. The result of the three simultaneous exposures is, in effect, a photograph from horizon to opposite horizon with sufficient overlap of the vertical photograph on the oblique photographs to permit a desired map assembly of the three prints and the transfer of their detail to the map base.

With the oblique cameras relatively arranged to form an oblique angle of 120°, the selected depression angle of each oblique camera is 30° which is the angle between a horizontal plane and the camera optical axis when the airplane is in normal level flight.

In actual flight, and at the instant of camera exposure, an airplane is usually somewhat tilted from a normal level flying position. This tilting may be the result of atmospheric conditions, such as air currents, air pockets, and the like. Since the cameras usually are fixed in position on the airplane, the cameras tilt with the airplane. Thus at the instant of camera exposure, the vertical camera may be tilted slightly away from a truly vertical position and the oblique cameras may have an actual depression angle somewhat different from the selected depression angle. Usually, the tilt of the airplane at the instant of camera exposure is not more than two degrees.

It has also been the practice to produce maps from a series of related sets of aerial photographs. A set of these photographs results from the simultaneous exposure of the three described cameras on an airplane in flight. As the airplane continues its flight over the area to be mapped, the exposure of the three cameras is repeated at selected intervals. From the exposed negatives, a series of related sets of aerial photographs are obtained.

It is an object of this invention to provide a camera lucida instrument which may be used with either vertical or oblique aerial photographs for transferring detail thereof to a map base in a tracing operation with the transferred detail appearing as if each photograph had been obtained with an aerial camera which had a truly vertical axis at the instant of exposure. The optical instrument, when properly adjusted, provides a virtual image of the photograph being copied, the image appearing to be disposed in the plane of the map base and being traced by the sketcher using the instrument. The instrument is also adapted to reproduce the cone of rays from the ground to the lens of the taking camera (whether of the vertical or oblique type) at the instant of exposure and thus enable the sketcher to secure traced details which are free of any tilt of the taking camera at the instant of exposure. Thus the instrument is adapted to rectify the tilt of a photograph whether it is of the vertical or oblique type.

Another object is to provide an improved prismatic unit for camera lucida innstruments.

Still another object is to provide a camera lucida prismatic unit which provides two wide angle views (or fields of view), one of the objects being traced, the other of the material on which the tracing is being made.

A still further object is to provide a camera lucida prismatic unit which includes the actual perspective points for viewing both the object space and the drawing space.

Another object is to provide a camera lucida prismatic unit which eliminates extraneous rays.

Still another object is to provide a camera lucida prismatic unit which is characterized by its provision of an extremely clear and bright image of the object to be traced.

A still further object is to provide a prismatic unit in which camera lucida mirrors are so incorporated as to be relatively free of accidental injury or damage.

Other objects and advantages of the present invention will be readily apparent from the following description, the appended claims, and the accompanying drawings, wherein:

Fig. 1 shows a vertical aerial photograph mounted in the instrument, and the latter resting on a map base.

Figure 1:
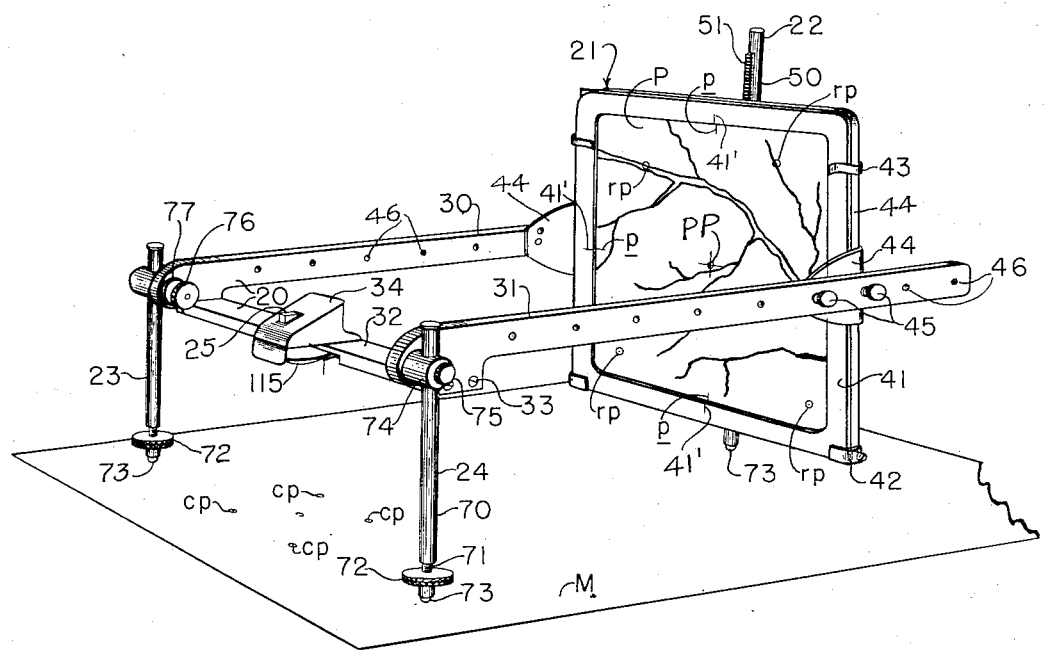
Fig. 1 is a front perspective view of an instrument embodying the present invention and adjusted for use with a vertical photograph.

The camera lucida instrument of this invention, in the illustrated embodiment, comprises a frame 20, an object holder 21, a rear leg 22, a set of two front legs 23, 24 and an optical or prismatic unit 25.

Figure 3:
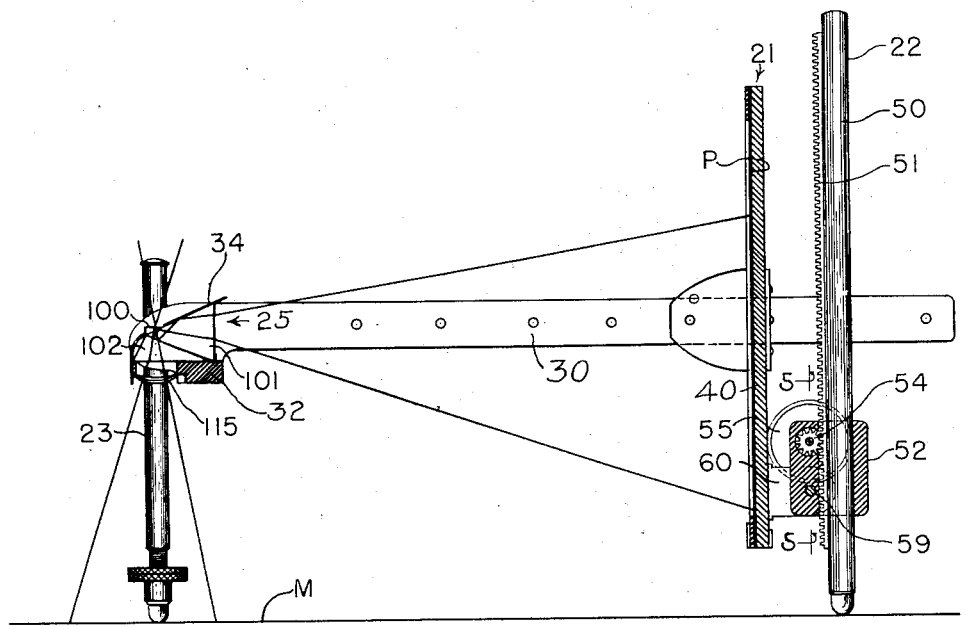
Fig. 3 is a vertical, cross-sectional view of the instrument of Figs. 1 and 2.

The frame 20 has two parallel arms 30, 31 extending rearwardly from and connected rigidly to the opposite ends of the tie member or cross piece 32. The arms 30, 31 and the tie member 32 may be separately formed and secured together in rigid relation by means of screws 33. The tie member 32 supports the prismatic unit 25 and its cover member 34. The cover member 34 provides a protecting enclosure for the sides, top and front of the prismatic unit 25, and has an opening through which protrudes an upper portion of the prismatic unit 25, as illustrated in Figs. 1 and 3, for example. The cover member 34 may be removably secured to the cross member 33 as by screws. The prismatic unit 25 is so supported and positioned that the object holder 21 is centered in the field of view or object space of the prismatic unit 25.

The object holder 21 comprises an object board or plate 40, to the lower corners of which is pivotally connected a frame 41 by means of hinges 42. The frame 41 is swung forwardly on the hinges 42 to facilitate the positioning of a photograph P against the forward face of the object board 40. The frame 41 is then swung rearwardly to clamping position, in which it presses the marginal portions of the photograph P against the object board 40 and is retained by removable spring clips 43.

Figure 2:
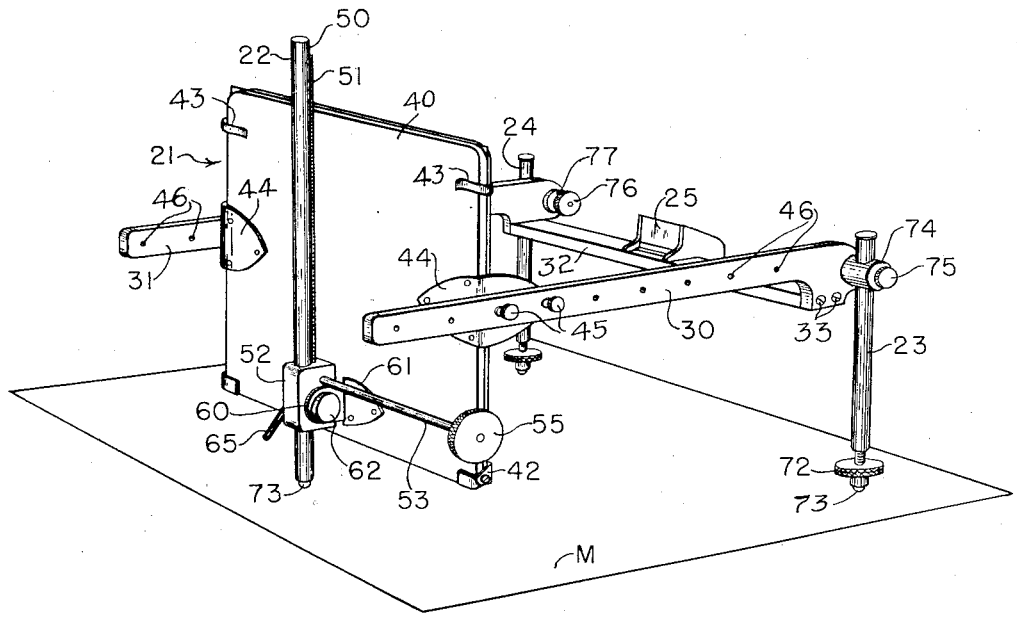
Fig. 2 is a rear perspective view of the instrument of Fig. 1.

The object holder 21 is secured to the two arms 30, 31 by two brackets 44 and removable thumb screws 45. The brackets 44 are suitably secured, as by screws or rivets, to the back of the object board 40, as shown in Fig. 2. The brackets 44 also extend along and in parallel relation to the arms 30, 31, each bracket 44 being rigidly but detachably secured to the adjacent arm (30 or 31) by two thumb screws 45. The arms 30 and 31 are provided with openings 46 through which the thumb screws 45 extend to engage threaded openings in the brackets 44. Each of the brackets 44 has two openings into which the thumb screws 45 may be threaded. These two openings in each bracket 44 are spaced apart a distance corresponding to the spacing of the thumb screw receiving openings 46 in either of the arms 30, 31. The spacing of the openings 46 in an arm (30, 31) is uniform, and the same spacing and positioning of the openings 46 is provided for both of the arms 30, 31.

The screws 45, being removable, permit the object holder 21 to be adjusted lengthwise of the arms 30, 31 and toward or away from the prismatic unit 25. In the illustrated embodiment, the object holder 21 may be adjusted into any one of seven positions relative to the prismatic unit 25. In each position of adjustment, the object board would be spaced from the virtual or effective perspective point (described hereinafter) of the prismatic unit 25 a distance equal to one of the standard focal lengths used in mapping cameras. Thus the positioning of the object board 40 would be determined by the principal distance of the photograph P being copied. If desired, the openings 46 may be replaced by longitudinal slots in the arms 30, 31. The use of slots would permit the object holder 21 to be adjusted by simply loosening, without removing, the thumb screws 45 and by shifting the object holder 21 with the thumb screws 45 sliding in the slots of the arms 30, 31. When the object holder 21 is set in adjusted position, it is held rigidly in place between the two arms 30, 31 by the thumb screws 45. The prismatic unit 25, the frame 20 and the object holder 21 then form a rigid assembly and have a predetermined relation which is unaltered by the leg adjustments of the instrument about to be described.

The instrument may be adjusted so that the bottom edge of the object holder 21 rests on the surface, such as a table top or map base, on which the instrument is placed, and the rear leg 22 is supported solely by the object board 40. The instrument is also adjustable to place the object holder 21 in various elevated positions (see Figs. 3 and 11) with the object holder 21 supported by the leg 22.

The leg 22 (see Fig. 3) comprises a rod 50, to which is secured a longitudinally extending rack 51 (Fig. 3). This leg 22 is axially slidable in a block 52. A shaft 53 (Fig. 5) journaled in the block 52 carries a pinion 54 which meshes with the rack 51 (Fig. 3) of the leg 22. The block 52 is designed to accommodate the pinion 54, the leg 22, their cooperative relation, and their movements. The end of the shaft 53 carries a thumb wheel 55 (Fig. 2), which may be manually operated to rotate the pinion 54 and shift the leg 22 in one or the other direction relative to the block 52.

Figure 5:
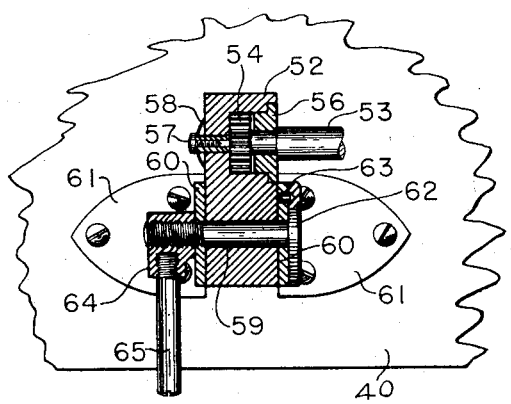
Fig. 5 is an enlarged cross-sectional detail view taken on line 5—5 of Fig. 3.

A removable bearing 56 (Fig. 5) may serve as a closure for the recess in the block 52 which receives the pinion 54. The block 52, the leg 22, the pinion 54, the shaft 53 and the bearing 56 are retained in assembled and operative relation by a screw 57 threaded into the end of the shaft 53 and a washer 58 fitted between the head of the screw 57 and the block 52, as shown in Fig. 5. The shaft 53, the bearing 56 and the pinion 54 are removable as a unit from the block 52 when the screw 57 has been removed from the end of the shaft 53.

The block 52 is rotatably mounted on a pivot and clamping pin 59 which is journaled in two ears 60. Each ear 60 is integral with a plate 61 which is suitably secured to the back of the object board 40 (see Fig. 5). One end of the pin 59 has a flat head 62 having a recess for receiving the end of a pin 63 mounted in the adjacent ear 60. The other end of the pin 59 is threaded into a clamping nut 64 having a handle 65 (Figs. 2 and 5). Rotation of the nut 64 in one direction by the handle 65 releases the block 52 for rotary adjustment about the pin 59. Rotation of the nut 65 in the other direction is effective to clamp the block 52 in adjusted position, the nut 64 and the pin head 62 forcing the ears 60 into clamping engagement with the side faces of the block 52. The engagement of the pin 63 and the pin head 62 prevents turning of the pin 59 during adjustment of either the nut 64 or the block 52.

Figure 4:
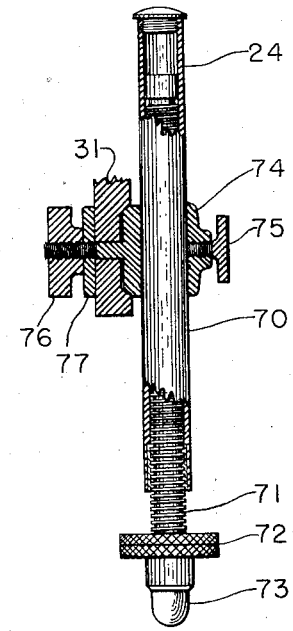
Fig. 4 is an enlarged view, partly in cross-section and partly in elevation of one of the front legs of the instrument of Figs. 1, 2 and 3.

The front legs 23, 24 are constructed and connected to the forward end of the frame 20 in the same manner and as illustrated in detail in Fig. 4. A front leg comprises a tubular member 70 interiorly threaded to receive the threads of a screw 71 which is secured to a thumb wheel 72 and a foot 73. The tubular member 70 is slidably received for axial movement in a bore of the head of a stud member 74 and is secured in adjusted position by a set screw 75. The inner end of the stud head is tapered and fits into a similarly shaped recess in the adjacent arm, as illustrated in Fig. 4. A clamping nut 76 and a washer 77 are carried by the threaded end of the stud member 74. Each of the front legs 23, 24 is thus provided with three separate adjustments. A fine and precise adjustment of the effective leg length is accomplished by rotating the thumb wheel 72. A second adjustment of the effective leg length is accomplished by sliding the leg axially and relative to the head of the stud 74. A third adjustment of a front leg is provided by the stud 74. The leg and the stud 74 may be rotated as a unit about the stud axis and clamped in adjusted position by tightening the clamping nut 76. The axes of rotation of the studs 74 are in alignment with each other, are parallel to the plane of the object board 40, and are perpendicular to the axes of the legs 23, 24. One important advantage of the third adjustment (about a stud axis) of a front leg (23, 24) is that it enables the sketcher to place the front leg in a vertical position regardless of the tilt of the frame 20 by the rear leg 22. A vertical positioning of the front legs 23, 24 minimizes creeping of the instrument during adjustment of their feet 73 by the thumb wheels 72. In the course of adjusting the instrument for a tracing operation, it is recommended that the legs 23, 24 be adjusted to rest on the map base M in vertical positions as a preliminary to the final adjustments of the instrument for tilt and scale.

*Camera lucida prismatic unit*

The prismatic unit 25 enables a sketcher to trace the details of a photograph P on a map base M on which the instrument may rest. When the instrument is adjusted for a particular photograph P and tracing operation, the sketcher looks into the unit 25 and observes a vertical image of the photograph P which appears to lie on the surface of the map base M. In securing this optical effect, the unit 25 provides two fields of view. The photograph P is in one field of view. The map base M is in the other field of view.

Figure 7:
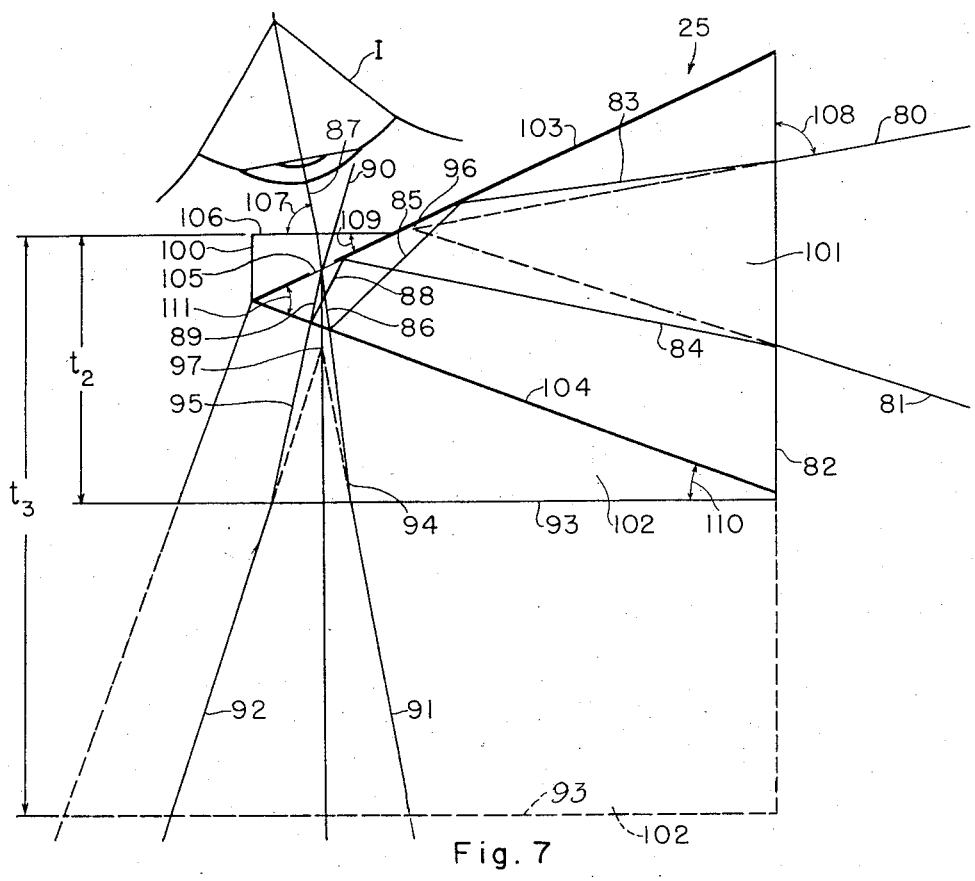
Fig. 7 is an explanatory diagram of the prismatic unit of Figs. 3 and 6.

Figure 7 illustrates two representative incident rays 80 and 81 which are included in the field of view for the photograph P and which enter the unit 25 through its incident refracting face 82. The incident rays 80 and 81 are refracted as rays 83 and 84, respectively. The ray 83 is internally reflected as ray 85, which in turn is reflected as ray 86. Ray 86 emerges from the unit 25 as emergent ray 87. The ray 84 is internally reflected as ray 88, which in turn is reflected as ray 89. Ray 89 emerges from the unit 25 as emergent ray 90.

Figure 7 also illustrates two representative incident rays 91 and 92 which are included in the field of view for the map base M and which enter the unit 25 through its incident refracting face 93. The incident rays 91 and 92 come from two points on the map base M which correspond, in their relation, to two points on the photograph P from which come the rays 80 and 81, respectively. The ray 91 is refracted as ray 94, which is coincident with the ray 86. Ray 86, as previously stated, emerges as ray 87. The ray 92 is refracted as ray 95, which is coincident with ray 89. Ray 89, as previously stated, emerges as ray 90. It is now evident that ray 87 is the emergent ray for both of the incident rays 80 and 91 and that ray 90 is the emergent ray for both of the incident rays 81 and 92. Thus for any corresponding points on the photograph P and the map base M, a single emergent ray is provided. This emergent ray may be considered as two coincident emergent rays which to the eye appear as a single ray.

The virtual or effective perspective points for the two fields of view, according to the construction of Fig. 7, are located internally of the unit 25. These points may be determined approximately by projecting the rays 80, 81, 91 and 92 until they intersect, as illustrated by the broken lines in Fig. 7. Thus the virtual or effective perspective points for the two fields of view are indicated by the reference numerals 96 and 97.

Figure 6:
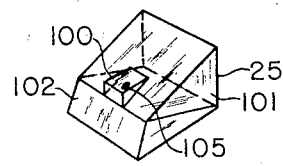
Fig. 6 is an enlarged perspective view of the prismatic unit of the instrument illustrated in Fig. 3.

The unit 25 is an optical or prism system of three prisms 100, 101, 102 of transparent refracting material, such as so-called "optical glass," and preferably having the same index of refraction. The three prisms 100, 101, and 102 are arranged (note Figs. 3, 6 and 7) in superimposed face to face relation, and are optically cemented in such relation.

The uppermost prism 100 is an eye prism into which the sketcher looks for the purpose of observing the map base M, the point of the pencil he is using in his tracing operations, and a virtual image of the photograph P.

The central or principal prism 101 is an internal reflecting objective prism for viewing the photograph P and provides a virtual image of the photograph P which may be seen through the eye prism 100.

The lowermost or base prism 102 is a simple (non-reflecting) refracting objective prism. Rays from the map base M pass through the prisms 102, 101, 100, in the order named and according to the laws of refraction, and then to the sketcher's eye I (Fig. 7).

The prismatic unit 25 offers a number of important and desirable advantages. One of these advantages is the durability of its reflecting surfaces. The upper and lower faces of the central prism 101 are reflecting faces for rays within the prism (101). Each of these two faces is covered, for such purpose, with a layer of reflecting material which may, for example, be silver or aluminum.

Before the eye prism 100 is cemented to the central or objective prism 101, the upper face of the prism 101 is coated with a film of reflecting material. The outer surface of this film is covered with a protective coating of black lacquer or other suitable material. This reflecting film and protective coating are indicated by the reference numeral 103 in Fig. 7 and preferably cover the entire upper face of the prism 101 except for a viewing orifice 105. Since all rays of the prism 101 striking its upper surface reflective coating or film are reflected (or absorbed), the upper face of the prism 101 serves as a full-reflecting mirror. The eye prism 100 is cemented to the coated prism 101 with the prism 100 positioned directly over the viewing orifice 105. The described full-reflecting mirror is protected against injury by both the described protective coating and the cover 34 (Fig. 3). The cover 34 overlies the entire exposed surface of the protective coating and is apertured to permit the eye prism 100 to extend therethrough, as illustrated in Figs. 1 and 3.

The lower face of the prism 101 has both light reflecting and light-transmitting properties and may therefore be termed a semi-transmitting mirror. For this purpose, a thin coating or film 104 of reflecting material is provided on either the lower face of the prism 101 or the upper face of the prism 102 before these two faces are cemented optically together. The semi-transmitting mirror will reflect light rays of the prism 101 and also will transmit light rays from the prism 102 into the prism 101. This second mirror or semi-transmitting film 104 is inherently delicate, but when disposed between two optically cemented prisms (101, 102), the film not only serves its intended function but also is protected from dirt, fingerprints, scratches, etc., to which it would be subjected if exposed to the atmosphere.

Another important advantage which is secured by the prismatic unit 25 is the wide angle of view, which is illustrated by Figs. 3 and 7. Thus the unit 25 serves the purpose of camera lucida mirrors, and yet provides a wider angle of view than would be secured with conventional camera lucida mirrors in the positions of the mirror films 103 and 104. The wider angle of view results from the refraction properties of the prisms 101 and 102.

The wide angular field of view afforded by the prismatic unit 25 will be evident when the law of refraction is considered with respect to a ray of light entering either the incident refracting face 82 of the objective prism 101 or the incident refracting face 93 of the objective prism 102. The angle of incidence of a light ray 80 before entering the prism 101 may be compared with the angle of refraction of the ray 83 after entering the prism 101 according to the law of refraction, which is as follows:

Sin $i = n$ sin $r$, in which $i$ is the angle of incidence, $r$ is the angle of refraction, and $n$ is the index of refraction of the prism glass which may be, for example, 1.52. Applying the law of refraction to a unit 25 of optical glass having an index of refraction of 1.52:

$$\text{Sin } i = 1.52 \sin r \text{ and}$$
$$i = \text{approximately } 1.52 \, r$$

Thus the field of view of the unit 25 is $n$ (or 1.52) times the field of view that would be provided by two conventional camera lucida mirrors in air (one full reflecting mirror and one semi-transmitting mirror) in the relation of the mirror films 103 and 104.

The marginal rays of the field of view through each of the incident refracting faces 82 and 93 obviously follow the law stated above. Therefore, each of these angular fields of view in air is approximately $n$ (or approximately 1.52, if that is the index of refraction for the optical glass used) times the angle of the field when measured from the virtual perspective point (96 or 97) within the unit 25.

The prismatic unit 25 may be of relatively small size and thus offer the advantage of being compact. It is also obvious that for any given size and geometrical form for a unit 25, the field of view can be increased by the use of optical glass with a higher index of refraction.

The viewing orifice 105 functions similarly to a conventional peep sight of a rifle and serves as the actual perspective point for the two angular fields of view of the prismatic unit, the photograph P being in one field of view and the map base M being in the other field of view. However, in order for the viewing orifice 105 to function as a true perspective point, it is necessary that it should be smaller than the pupil of the eye. The viewing orifice 105 is also so related to the objective prisms 101 and 102 that the sketcher may observe through the orifice 105 the entire angular field of view provided by each of the objective prisms 101 and 102. The depth of the orifice 105 is the spacing of the cemented prisms 100 and 101. The mirror surface 103 is so relatively thin that the prisms 100 and 101 are closely spaced. The orifice 105 is actually filled with optical cement which does not materially interfere with rays passing from the objective prism 101 to the eye prism 100.

The prisms 100 and 102 eliminate chromatic aberration and other optical distortion. The eye prism 100 eliminates chromatic aberration of light rays passing from the photograph P through the objective prism 101 and to the eye (I) of the sketcher. The objective prism 102 supplements the eye prism 100 in eliminating chromatic aberration of the rays passing from the map base M through the objective prism 101 to the eye of the sketcher.

Chromatic aberration is avoided by the eye prism 100 since each ray emerging from its emergent face 106 forms an angle therewith which is identical to the angle formed by the same (its incident) ray and the incident refracting face (82 or 93) when the incident ray enters the unit 25. Thus ray 87 is the emergent ray for the incident ray 80 and the angles 107 and 108 are equal.

Figure 8:
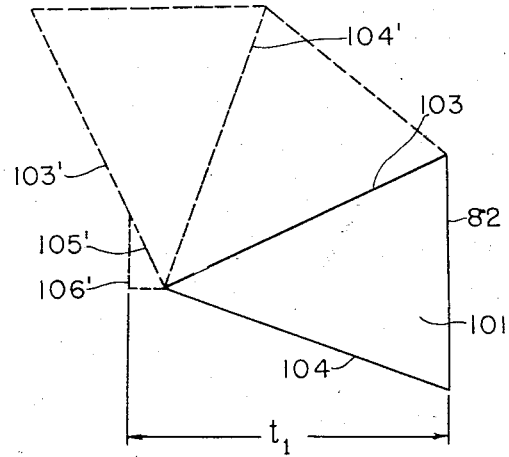
Fig. 8 is a diagrammatic showing to illustrate the development of the principal angle of the eye prism from the central objective prism of the prismatic unit of Figs. 3, 6 and 7.

When the prisms 100 and 101 are of optical glass and have the same index of refraction, the principal or vertex angle 109 of the eye prism 100 should be of such size that the virtual image of its emergent face 106 is in a plane parallel to the plane of incident refracting face 82 of the objective prism 101, this parallel relation being diagrammatically illustrated in Fig. 8. Figure 8 assumes that the objective prism 101 is being examined from a point in the field of view for the photograph P. When the observer's eye looks through the incident refracting face 82, a first reflection of the surface 104 is seen in plane 104'. A second reflection, which is a reflection of the surface 103, appears to lie in plane 103'. A third reflection, which is a reflection of the emergent face 106 (Fig. 7), is seen through the image 105' (Fig. 8) of the aperture 105 (Fig. 7) and appears to lie in plane 106' (Fig. 5). When the image plane 106' (Fig. 8) of the emergent face 106 (Fig. 7) is parallel to the incident refracting face 82, the eye prism 100 has such principal angle 109 as will eliminate chromatic aberration of the light rays from the photograph P.

The optical effect of the prisms 100 and 101 is the same as viewing the photograph P through a single plate of glass having parallel surfaces and a thickness $t_1$ (the distance in Fig. 8 between the image plane 106' and the plane of the incident refracting face 82).

The prism 102 is provided so that a ray from the map base M will enter and leave the prismatic unit 25 at equal angles to eliminate chromatic aberration. This optical feature is secured by having the principal or vertex angle 110 of the prism 102 equal to the principal or vertex angle 111 of the prism 101 minus the principal angle 109 of the prism 100. This relationship of angles provides the entrance and emerging faces 93 and 106 in parallel planes. The effect of the optical unit 25 on a ray from the map base M is the same as if it had passed through a plate of glass with parallel surfaces and a thickness $t_2$ (Fig. 7), which is the distance between the faces 93 and 106.

A ray passing from the photograph P and through the prisms 101 and 102 is subject to the same distortion as it would be in passing through a plate of glass of thickness $t_1$ (Fig. 7). This distortion may be nicely balanced or offset by increasing the depth of the prism 102, as indicated by dotted lines in Fig. 7, so that the distance between the faces 93 and 106 is $t_3$ (that is, equal to $t_1$). The rays from the two fields of view would then be subject to the same distortion before reaching the eye. However, the smaller size for prism 102 (the size indicated in full lines in Fig. 7) offers no practical difficulties, contributes to the compactness of the unit 25, and provides reasonably precise performance for the unit 25.

The angle of deviation between two corresponding rays, one from a point on the map base M and one from the corresponding point on the photograph P, is twice the principal angle 111 of the prism 101. In the illustrated and preferred form of this invention, the angle 111 is a forty-five degree angle, and the angle of deviation of the two corresponding rays 80 and 91 is a ninety degree angle. A forty-five degree angle for the angle 111 is preferred for reasons which may be more clearly explained in connection with the operation of the present instrument.

The angle 112 of the objective prism 101 is determined in accordance with the desired point of entrance of its chief normal ray 113 (Fig. 9) in the prism face 82. The chief normal ray is the ray which is normal to the face 82 and passes through the center of the viewing orifice 105.

In a preferred embodiment of this invention, the chief normal ray 113 is also normal to the plane of the photograph P and passes through its principal point PP. The optical system would then have the planes of the face 82 and the photograph P in parallel relation. This optical relationship would minimize total distortion, since any distortion resulting from refraction of light passing through the prismatic unit 25 is symmetrical and radial to the principal point PP.

Figure 10:
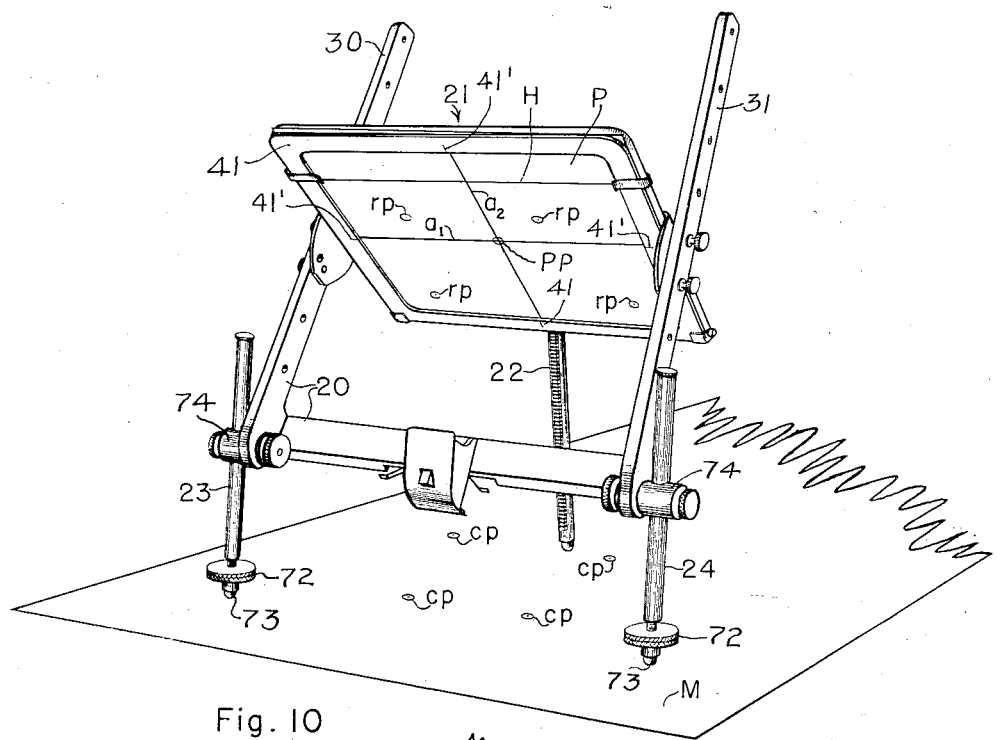
Figs. 10 and 11 are views of the instrument of Figs. 1, 2 and 3 as adjusted for use with an oblique aerial photograph, Fig. 10 being a perspective view and Fig. 11 being a vertical cross-sectional view.

The useful map detail on an oblique photograph P, such as illustrated in Fig. 10, extends from near the lower edge of the photograph P to slightly above its principal point PP. As the horizon H on the photograph P is approached, the photographic detail becomes too small in scale to map with sufficient accuracy. The angle 112 of the objective prism 101 may be formed of such size that all of the useful detail on the oblique photograph P may be transferred to the map base M.

Figure 9:
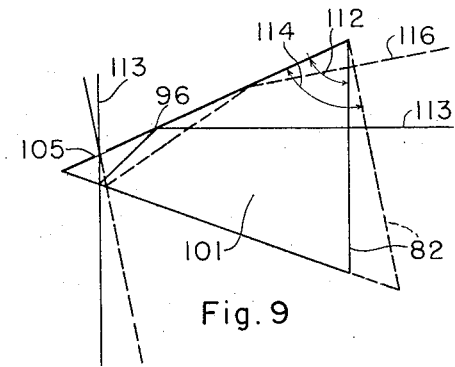
Fig. 9 is an explanatory diagram of the central objective prism of the prismatic unit of Figs. 3, 6 and 7.

Although the angle of view of the photograph P provided by the prismatic unit 25 is large, it may not be adequate to cover the entire oblique photograph P when its principal distance is small and its spacing relative to the virtual perspective point 96 corresponds to its principal distance. However, this problem presented by a small principal distance can be met by providing such an angle 112 that the chief normal ray 113 passes through the prism face 82 at a relatively high point thereon, as shown in Fig. 9. The portion of the field of view below the chief normal ray 113 will then be greater than the portion of the field of view above the chief normal ray 113. All of the required detail below the principal point PP of the photograph P (Fig. 9) is thus placed within the field of view, while maintaining the spacing of the unit 25 and the photograph P, according to the principal distance of the latter. Although the chief normal ray 113 does not pass through the center of the face 82, no material or substantial part of the total angular field of view is lost.

Figure 9 illustrates the prism 101 in full lines with a preferred angle of sixty-five degrees for the angle 112 and the resulting chief normal ray 113. A larger angle 114 (see angle provided by face 82 shown in dotted lines in Fig. 9) will shift the chief normal ray upwardly (see ray 116, Fig. 9), increase the portion of the angular field below the chief normal ray, and decrease the portion of the angular field of view above the chief normal ray. Decreasing the angle 112 of the objective prism 101 will have an opposite effect.

It is also to be noted that the required angles for the principal angles 109 and 110 of the prisms 100 and 102, respectively, will change when the angle 112 of the prism 101 is changed. The relation of these angles is described elsewhere in this disclosure.

The circular aperture 105 in the full-reflecting mirror film and its lacquer coating is a viewing orifice through which pass the rays from the two fields of view to the eye of the sketcher. The orifice or aperture 105 substantially eliminates parallax between the virtual image of the photograph P and the map base M itself due to eye movement. The orifice 105 also affords a maximum field of view, as the reflective coating 103 surrounding and in the vicinity of the orifice 105 is useful in extending the limit of the field of view of the photograph P. Although the reflection of the orifice 105 appears in the field of view, the reflection is small and will not materially handicap the use of that portion of the field in which it appears.

The distance from the vertex of the principal angle 111 to the center of the viewing orifice 105 is preferably about twice the diameter of the orifice 105, but this ratio may be varied in accordance with the use for which the unit 25 is designed. If the spacing of the orifice 105 from the vertex of angle 111 is decreased, an increase in the field of view of the photograph P is secured, the field below the chief normal ray being decreased and the field above the chief normal ray being increased to a greater extent. As the distance is decreased, the reflected image of the viewing orifice 105 in the lower part of the field of view becomes larger and more objectionable, though for most uses, the image is so low in the field that it is not seen.

Relation of tilt axes of the instrument to its optical system

In a preferred embodiment of this invention, the stud (74) axis about which the front legs 23 and 24 are rotatably adjustable passes through the virtual perspective point 97 and is parallel to the incident refracting faces 82 and 93 (Fig. 7). This positioning of the axis for rotatable adjustment of the front legs 23 and 24 is provided for the following reasons. In any position of tilt of the frame 20, the front legs 23 and 24 may be adjusted in parallel relation and to vertical positions. The front legs 23, 24 will then provide a tilt axis for the instrument as a whole, which extends between the points of contact of the feet 73 and the map base M and lies in the plane of the map surface. Thus with the instrument adjusted for a given scale ratio in the tracing operation, the instrument may be adjusted for tilt, without appreciably affecting the scale ratio, by operating the thumb wheel 55 and shifting axially the rear leg 22.

The other or second tilt axis of the instrument as a whole extends from the point of contact of the leg 22 and the map base M to the first tilt axis of the instrument which has been above described. These two axes are normal to each other and the illustrated leg adjustments permit their intersecting point to be positioned directly below the virtual perspective point 97. With this relationship of axes and the point 97, the instrument may be tilted about either axis without appreciable change in scale ratio. Adjustment of this instrument about the second tilt axis is secured by rotating the front feet 73 to the same extent and in opposite directions.

Figure 11:
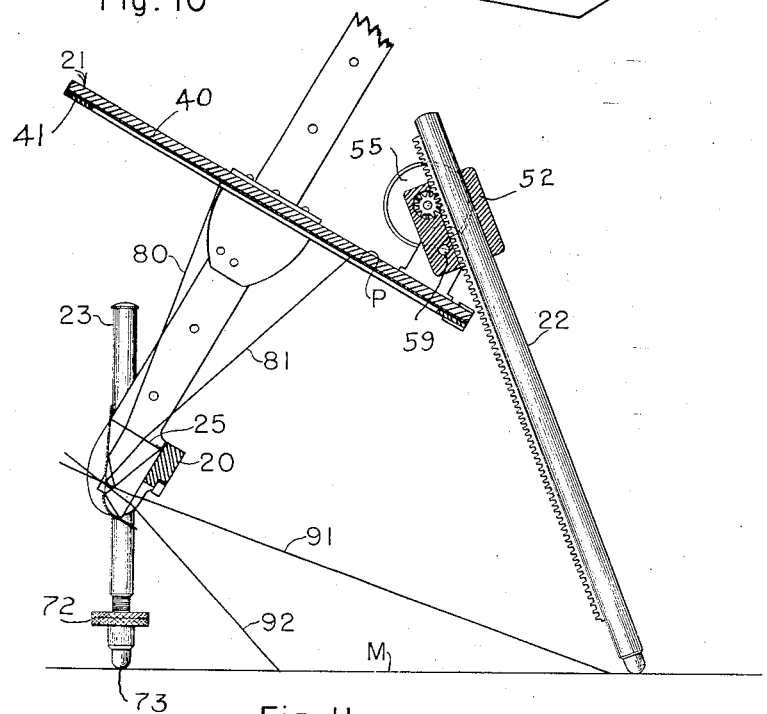

When the instrument is used with an oblique photograph P, as in Figs. 10 and 11, the front legs 23 and 24 in contacting the map base M can provide a tilt axis for the instrument which is parallel to the tilt axis of the photograph. With this relation of the tilt axes of the instrument and an oblique photograph, proper tilting of the instrument is simplified.

Operation with vertical photographs

In preparing for a sketching operation, a photograph P is placed on the object board 40, adjusted to a proper setting, and secured in place.

Index marks 41₁ on the frame 41 and fiducial marks p on the photograph P serve as guides in positioning the photograph P on the object board. When the marks 41₁ and p are in register, the principal point PP of the photograph P will lie at the base of a perpendicular from the virtual perspective point 96 (Fig. 7). This setting is preferred since the photograph P and the virtual perspective point 96 should be in the same geometrical relation as existed between the film and the rear nodal point of the taking camera. When the photograph P is properly adjusted, it is held in adjusted position by the clamping action of the object board 40, the frame 41, and the clips 43.

The object board 40 is preferably adjusted so that the distance from the virtual perspective point 96 of the objective prism 101 to the photograph P is equal to the principal distance of the photograph P.

If the photograph P is free of tilt, the instrument legs 22, 23, and 24 are adjusted so that the planes of the prism face 93 and the map base M are parallel and spaced to provide a desired scale ratio.

The map base or manuscript M, to which detail is to be transferred, is preferably placed on a flat, level surface, such as a horizontal table top or drawing board. When the map base M is small, the instrument legs 22, 23 and 24 will rest directly on the table top. When the map base M is relatively large, the instrument legs 22, 23 and 24 will rest directly on the map base M (see Fig. 3).

The map base M and the instrument are so oriented that the sketcher, by placing his viewing eye opposite and over the viewing orifice 105 (see Fig. 7), may view the virtual image of the photograph P in proper register with the corresponding section of map base M. If a small map base M is used, orientation may be secured by shifting or sliding either the map base M or the instrument on the surface of the table top. If a large map base M is used, the instrument may be shifted on the surface of the map base M to secure proper orientation.

When a tilted, vertical, aerial photograph is being traced, theoretically correct tilt rectification can be obtained by adjusting one or more of the legs 22, 23 and 24 to tilt the instrument in relation to the map in the same relative direction and in the same amount as the taking camera was tilted at the instant of exposure.

As a guide in securing accuracy in the making of aeronautical maps or charts from a plurality of aerial photographs, each photograph has a number of selected reference image points $rp$ marked or circled on it which are termed pass points. Each map section corresponding to a particular photograph P is provided with a corresponding set of reference or control points $cp$ (Fig. 1) which are located thereon in true map position. Before the sketcher traces photographic detail onto the map base M the pass points $rp$ visible in the virtual image of the photograph P are brought into registry with the corresponding control points $cp$ on the map base M by adjusting the legs 22, 23 and 24 and slidably adjusting the instrument.

Adjustment for scale is made by raising or lowering the instrument by means of the legs 22, 23 and 24. As the height of the instrument is increased, the map control points $cp$ will appear to converge. As the instrument is lowered, the map reference points $cp$ will appear to diverge. Thus the set of photographic reference points $rp$ can be rapidly brought into apparent registry with the corresponding set of map control points $cp$.

If the photograph P is tilted due to the camera being tilted at the instant of exposure, the tilt can be rectified by tilting the instrument in a corresponding direction by means of the legs 22, 23 and 24. As previously mentioned, the instrument is raised, lowered and tilted without any change in the relation between the prismatic unit 25 and the photograph P. Tilting of the instrument may be secured without changing the scale or optical ratio if desired.

The instrument adjustment is satisfactory and the instrument is properly oriented when the pass points $rp$ on the photograph P appear to coincide nearly or exactly with the corresponding control points $cp$ on the map base M. If all the pass points $rp$ on the photograph P were of the same ground elevation, it would be possible to make them all coincide exactly with the points $cp$ on the map base M. If the terrain represented by the photograph P has an even slope, the instrument can be similarly tilted which will permit almost complete register of the photographic pass point $rp$ over the corresponding map control points $cp$.

A one to one scale ratio in sketching may be readily obtained by suitably adjusting the position of the object board 40 relative to the perspective point 96 and adjusting the legs 22, 23 and 24. For such scale ratio, a lens is not required.

However, a lens 115 (Fig. 1) is recommended to bring the map base M into focus with the photograph P if the optical ratio is not one to one (1:1). The use of the proper lens to bring the map M into focus with the virtual image of the photograph P will also eliminate any small amount of parallax which might occur due to moving the eye out of line with the viewing orifice 105.

When the instrument is properly adjusted and oriented, the sketcher proceeds with the tracing operation. Theoretical tilt rectification is secured since the tilt of the cone of rays from the ground to the camera lens at the instant of camera exposure in obtaining the photograph P is reproduced in the tilt of the cone of rays from the map base M to the actual perspective point in the viewing orifice 105. The tracing operation may be performed with a pencil which is moved over the map base M as directed by the virtual image of the photograph P. The sketcher obtains a clear and sharp view of both the photograph P and the map base M. All extraneous rays are eliminated. All rays from the two fields of view pass through the viewing orifice 105 before reaching the sketcher's eye.

In a sketching operation, the eye (I) is positioned, for example, as illustrated in Fig. 7, and observes through the eye prism 100 and the viewing orifice 105 a substantial portion of the possible field of view of the photograph P and the corresponding portion of the field of view of the map base M. Detail in this observed area is sketched. The eye I is shifted appropriately over the orifice 105 from time to time for the purpose of tracing all detail which may be observed through the orifice 105 for a particular orientation of the instrument relative to the map base M.

If a vertical photograph P is not tilted over a few degrees (the average tilt is about one degree), satisfactory rectification of the photograph tilt can be obtained although the object board 40 is spaced from the virtual perspective point 96, a distance which is substantially greater than the principal distance of the photograph P. Such greater spacing or distance may be desirable for a number of reasons. The photograph P may have a relatively short principal distance, in which case spacing of the photograph P from the perspective point 96, according to the principal distance of the photograph P, may not place the photograph P entirely within the field of view of the objective prism 101. A greater spacing, however, would place the photograph P entirely within the field of view of the prism 101. A greater scale reduction ratio also may be obtained conveniently by providing a greater spacing of the photograph P and the perspective point 96.

The instrument, from time to time, may be shifted slightly to bring individual reference points into exact register as the detail in this vicinity and at similar elevation is being sketched. For example, when tracing a stream, the sketcher should hold to points on or near that feature. Likewise, a ridge is traced when points on its crest are in register. If there are no pass points on a feature, a skilled operator can adjust between points of various elevation. The work of transferring detail may be extended out to the edge of the photograph P.

The instrument permits the sketcher to rest his head on the cover 34 (Fig. 3) with his eye at the observation point I (Fig. 7). This head position may be maintained during the sketching operation and also during adjustment of the instrument legs 22, 23 and 24 or the instrument relative to the map base M. The sketcher may also view the photograph P directly by slightly raising his head from its position of rest on the instrument.

An angle of forty-five degrees for the principal angle 111 of the prism 101 has been indicated as an optimum. This forty-five degree angle is one-half of the angle of deviation of a ray from the photograph P and a corresponding ray from the map base M. Thus the angle of deviation is ninety degrees, and a vertical photograph P may have the positioning of Fig. 3 in a sketching operation. If the principal angle 111 of the prism 101 were smaller than forty-five degrees, the angle of deviation of rays from the two fields of view would be smaller and the object board 40 would require a lower position. A lower positioning of the object board 40, however, would interfere with the instrument being adjusted to obtain a large reduction in scale ratio.

*Operation with oblique photographs*

When a map tracing is to be made from an oblique photograph P (Fig. 10), the latter is provided with two reference lines or axes $a_1$ and $a_2$ which are perpendicular to each other and which intersect at the principal point PP of the photograph P. If the horizon line H is on the photograph P, it (H) serves as a reference line in drawing the axes $a_1$ and $a_2$. The axis $a_1$ is drawn parallel to the horizon line H and through the principal point PP. The axis $a_2$ is drawn perpendicular to the axis $a_1$ and through the principal point PP.

If the horizon is not on the photograph P, the axis of tilt of the photograph P is determined according to well-known photogrammetric procedure, and the location for the axes $a_1$ and $a_2$ is determined by reference to the axis of tilt of the photograph.

The oblique photograph P is provided with a series of reference or pass points $rp$ in preparing the photograph for use in the present instrument. The map base M (Fig. 9) is also provided with a number of control points *cp* in true map position and corresponding to the reference points *rp* of the photograph P.

The oblique photograph P is adjusted on the object board 40 with the aid of the reference lines or axes $a_1$ and $a_2$ and the reference marks 41' on the frame 41. The oblique photograph P is properly positioned on the object board 41 when the axis or reference line $a_2$ registers with the index marks 41' on the top and bottom sides of the frame 41 and the axis line $a_1$ is in register with the index marks 41' on the opposite sides of frame 41. The object board 40 and the frame 41 are clamped together by means of the spring clips 43 for the purpose of retaining the oblique photograph P in the adjusted position.

The object holder 21 is secured to the arms 30, 31 in such position that the photograph P and the virtual perspective point 96 (Fig. 7) are spaced apart a distance which is the same as the principal distance of the photograph P, that a line from the perspective point 96 to the principal point PP of the photograph P (Fig. 10) is perpendicular to the plane of the photograph P, and that the photograph P is in a plane parallel to the incident refracting face 82 of the objective prism 101.

The photograph P and the perspective point 96 are now in the same geometrical relation as the film and the inner nodal point were in the taking camera.

The front and rear legs 22, 23 and 24 are adjusted (Fig. 11) so that the cone of rays from the map base M to the viewing orifice 105 of the prismatic unit 25 has the same angle of tilt with reference to the plane of the map base M as the cone of rays from the ground to the camera lens at the time of the camera exposure. This tilt adjustment (Fig. 11) of the instrument, which does not change the optical relation of the photograph P and the prismatic unit 25, provides tilt rectification of the photograph P in the tracing operation. The proper angle of tilt for the cone of rays from the map base M to the viewing orifice 105 is secured when the virtual images of selected reference points *rp* on the photograph P register with the corresponding control points *cp* on the map base.

As illustrated in Figs. 10 and 11, the object holder 21, the frame 20, and the prismatic unit 25 are tilted as a unit and at a substantial angle for the tracing operation. This tilting is accomplished principally by adjustment of the rear leg 22, which has its effective length altered by operation of the thumb wheel 55. As the rear leg 22 has its effective length adjusted, the instrument is tilted about a first axis in the plane of the map base M and extended between the front legs 23, 24. The instrument may also be tilted by rotating the thumb wheels 72 of the front legs 23 and 24 equally in opposite directions. This adjustment of the feet 73 of the front legs 23 and 24 tilts the instrument about a second axis which is perpendicular to the first tilting axis of the instrument which passes through the point of contact of the rear leg 22 and the map base M.

The three legs 22, 23 and 24 may also have their effective lengths adjusted for the purpose of elevating or lowering the object holder 21, the frame 20, and the prismatic unit 25 for the purpose of adjusting the scale for the tracing operation.

The scale ratio for the instrument is in direct proportion to the perpendicular distance from the plane of the map base M to the map space perspective point 97, whether the instrument is being used for the purpose of tracing a vertical or an oblique photograph.

The front legs 23 and 24 are rotatively adjusted relative to the frame 20 about the axes of the studs 74, so that the legs 23 and 24 will be in substantially a vertical position when the instrument is properly set for the tracing operation. The instrument will then be more steadily supported than it would be if the legs 23 and 24 were perpendicular to the arms 30 and 31 and formed an oblique angle with the plane of the map base M.

If it is found that the base of the rear leg 22 interferes with a particular area being sketched, this interference will be avoided by adjusting the rear leg 22 and its block 52 about the pivot pin 59.

If the terrain represented by the photograph P is not level, the instrument may be tilted from its position for correct tilt rectification by means of its adjustable legs 22, 23 and 24 in order to bring pass points *rp* in the photographic image to a better register with the corresponding map reference points *cp* preparatory to tracing detail. If the terrain is very rugged, a number of different instrument adjustments may be required in order to bring various sections of the photographic image into good register with the map base M. It has been found from experience that most of the adjustment of the instrument for differences in elevation of the terrain represented can be made with the rear leg thumb wheel 55.

Once the instrument is properly adjusted and oriented, the photographic image may be traced on the map base M. This tracing operation is the same as that explained with reference to the use of vertical photographs.

It has been stated that the optimum angle for the principal angle 111 of the prism 101 is forty-five degrees. A larger angle would place the object board 40 in a more elevated position than illustrated in the drawings. The object board 40 would then be too high for convenient illumination and observation when an oblique photograph P is being used.

A smaller principal angle for the prism 101 would also decrease its angular field of view. A larger principal angle for the prism 101 would necessitate a larger value for the angle 109 of prism and prevent close spacing of the sketcher's eye and the viewing orifice 105.

It is to be understood that the foregoing disclosure and the accompanying drawings are illustrative of this invention which includes all modifications and embodiments coming within the scope of the appended claims.

I claim:

1. In a camera lucida instrument, the combination comprising: a frame including spaced arms and a tie member extending between and rigidly secured to said arms adjacent the forward ends thereof; an object board extending between said arms and shiftable lengthwise thereof for adjustment relative to said tie member; means for releasably and rigidly securing said object board to said arms in each adjusted position; an optical unit rigidly mounted on said tie member and having two fields of view with one of the fields of view intersected by said object board and with the other field of view intersected by a surface on which the instrument may be placed; legs supporting said frame adjacent the forward ends of said arms and axially adjustable to vary the effective length thereof; said legs being also adjustable about aligned axes normal to the leg axes, parallel to said object board and passing through said optical unit; and a leg adapted to support said object board in adjusted positions within a range extending from an upright position to a substantially elevated, forwardly inclined position, said last named leg being mounted on the object board and being adjustable both axially and relative to said object board to adjust the elevation and inclination thereof.

2. An instrument as defined in claim 1, wherein each of said frame supporting legs is adjustably mounted in the head of a stud member carried by the frame, said stud members being rotatably adjustable about aligned axes and relative to said frame, and said frame supporting legs being axially adjustable relative to said stud heads.

3. An instrument as recited in claim 1, wherein the object board supporting leg is slidably and adjustably received by a member pivotally connected to said object board, means are provided for axially adjusting said object board leg relative to said leg receiving member, and means are provided for clamping said leg receiving member in selected positions of adjustment relative to said object board.

4. An instrument as recited in claim 1, wherein a frame is pivotally connected to the object board adjacent the lower edge thereof and is adapted in folded position to press the marginal edges of a photograph against said object board, and means are provided for retaining said object board and pressing frame in photograph clamping relation.

5. A camera lucida device in the form of an achromatic prism assembly comprising: an objective reflective and refracting principal prism having an incident refracting face, a second face provided with a full-reflecting mirror surface having a viewing aperture therein adjacent the principal prism vertex, a third face, and a vertex angle formed by said second and third faces; a refracting eye prism covering said aperture and having the incident face thereof optically cemented to said second face of said principal prism and also having a vertex angle formed by the incident and emergent faces of said eye prism; and an objective refracting base prism having an incident refracting face and an emergent face forming a vertex angle; said three prisms being formed of optical glass and having the same index of refraction; the emergent face of said base prism being optically cemented to said third face of said principal prism with a semi-transmitting mirror film therebetween and said incident face of said base prism being positioned parallel to the emergent face of said eye prism; the sum of said base prism vertex angle and said eye prism vertex angle being equal to said principal prism vertex angle; and said eye prism vertex angle being of such size that the virtual image of the eye prism emergent face is parallel to said principal prism incident face.

6. A device as recited in claim 5, wherein the base prism is of such size as to provide substantially as large a field of view as the principal prism, the eye prism is of such size and in such position relative to the viewing orifice as to provide substantially as large a field of view as said principal prism, and the edges of the emergent face of said base prism substantially coincide with the respective edges of the third face of said principal prism.

7. A device as recited in claim 5 wherein the full reflecting mirror surface is formed by a film of light reflecting material on the principal prism second face and an outer layer of protective material overlying said film.

8. A camera lucida device in the form of an achromatic prism assembly comprising: a triangular objective reflecting and refractive principal prism having an incident refracting face, a second face provided with a full-reflecting mirror surface having a viewing aperture therein adjacent the principal prism vertex, a third face, and a vertex angle of substantially forty-five degrees formed by said second and third faces; a triangular refracting eye prism covering said aperture and having the incident face thereof optically cemented to said second face of said principal prism and also having a vertex angle formed by the incident and emergent faces of said eye prism; and a triangular objective refracting base prism having an incident refracting face and an emergent face forming a vertex angle; said three prisms being formed of optical glass and having the same index of refraction of 1.52; the emergent face of said base prism being optically cemented to said third face of said principal prism with a semi-transmitting mirror film therebetween and said incident face of said base prism being positioned parallel to the emergent face of said eye prism; the sum of said base prism vertex angle and said eye prism vertex angle being equal to said principal prism vertex angle; and said eye prism vertex angle being of such size that the virtual image of the eye prism emergent face is parallel to said principal prism incident face.

9. A device as recited in claim 8 wherein the angle formed by the incident face and the second face of the principal prism is substantially sixty-five degrees.

JAMES L. BUCKMASTER.